United States Patent [19]

Moore

[11] 3,869,235
[45] Mar. 4, 1975

[54] APPARATUS FOR EXTRUDING A COVERING ON TO A CABLE CORE

[75] Inventor: Alexander Joseph Moore, Marlow, England

[73] Assignee: British Insulated Callender's Cables Limited, London, England

[22] Filed: June 18, 1973

[21] Appl. No.: 370,817

[30] Foreign Application Priority Data
June 19, 1972 Great Britain.................... 28682/72

[52] U.S. Cl.............. 425/113, 425/DIG. 55, 277/3, 277/16, 264/89, 277/27
[51] Int. Cl.............................................. B29f 3/10
[58] Field of Search ........... 425/113, 244, 245, 248, 425/DIG. 38, DIG. 55; 264/89, 90, 174, 314; 277/3, 16, 27, 34.3, 126, 128

[56] References Cited
UNITED STATES PATENTS

| | | | |
|---|---|---|---|
| 2,465,482 | 3/1949 | Rhodes............................. | 425/113 |
| 2,871,072 | 1/1959 | Parks et al......................... | 277/3 X |
| 3,337,222 | 8/1967 | Smith et al........................ | 277/34.3 |
| 3,689,610 | 9/1972 | Nicholson........................ | 425/113 X |
| 3,737,261 | 6/1973 | Hardesty........................... | 425/113 |

FOREIGN PATENTS OR APPLICATIONS

| | | | |
|---|---|---|---|
| 825,860 | 12/1951 | Germany............................ | 425/113 |
| 1,079,551 | 8/1967 | Great Britain...................... | 425/113 |
| 454,839 | 2/1950 | Italy................................... | 425/113 |

*Primary Examiner*—R. Spencer Annear
*Attorney, Agent, or Firm*—Webb, Burden, Robinson & Webb

[57] ABSTRACT

In apparatus for extruding a covering on to an advancing core and for continuously treating the covering with a fluid medium at super-atmospheric pressure, intended for use where the covering is applied to the core by a "float-down" process, sealing means associated with the core tube of the extrusion machine comprises at least one inflatable collar which will surround a core advancing through the bore of the core tube. A radially inner layer of heat-resistant material of a low coefficient of friction is positioned between the collar and the advancing core. The arrangement is such that when the inflatable collar is at least partially inflated it is constrained to effect a circumferential compressive force radially inward on the inner layer of heat-resistant material to cause the collar andd the inner layer to effect a substantially fluid-tight seal between the core tube and the advancing core. Preferably, the inflatable collar comprises a sleeve mounted on the radially inner surface of a tubular housing connected to the upstream end of the core tube, the sleeve being sealed at each of its ends to one of a pair of apertured barrier walls and overlying a passage in the circumferential wall of the housing through which fluid can be introduced to inflate the sleeve.

7 Claims, 3 Drawing Figures

PATENTED MAR 4 1975

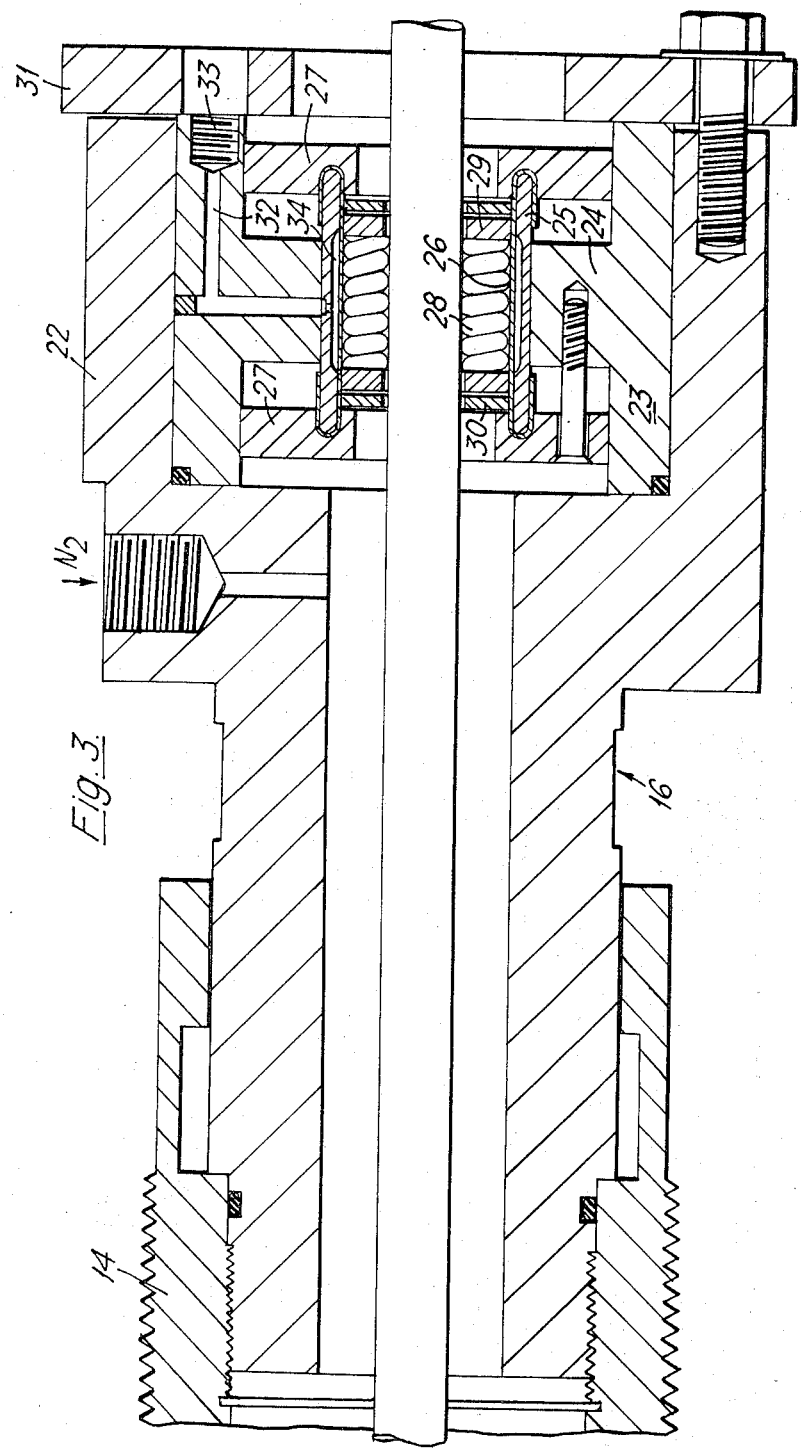

APPARATUS FOR EXTRUDING A COVERING ON TO A CABLE CORE

This invention relates to the manufacture of insulated electric cables or wires of the kind in which a covering is extruded directly or indirectly on the cable or wire and the covered cable or wire is then passed continuously through a vessel wherein the covering is cured or strengthened or otherwise treated by the application or abstraction of heat. Examples of such covering materials are natural rubber compositions, synthetic rubber-like compositions such as neoprene (polychlorobutadiene), butyl rubber, silicone rubber and styrene butadiene rubber (GR-S), and plastics materials such as olefine polymers containing a suitable agent for inducing cross-linking between the molecules of the plastics materials during the curing process. Each of these covering materials may or may not incorporate additives to render it electrically conductive.

According to the invention there is provided apparatus for extruding a covering on to an advancing core and for continuously treating the covering with a fluid medium at super-atmospheric pressure. The apparatus comprises an extrusion machine having an annular extrusion orifice defined by an outer die and an inner die or point mounted on the downstream end of a core tube extending through the machine; sealing means associated with the core tube which permits passage of the core therethrough; a treatment chamber which is hermetically sealed to the outlet end of the extrusion machine and through which the covered core emerging from the extrusion orifice is adapted to pass; means for introducing a fluid medium under super-atmospheric pressure into the treatment chamber; and means for injecting a fluid under pressure to the interior of the core tube. The sealing means comprises at least one inflatable collar associated with the core tube in such a way that it will surround a core advancing through the bore of the core tube and, positioned between the collar and said advancing core, a radially inner layer of a heat-resistant material of a low coefficient of friction. The arrangement is such that when the inflatable collar is at least partially inflated it will be constrained to effect a circumferential compressive force radially inward on the inner layer of heat-resistant material to cause the collar and the inner layer to effect a substantially fluid-tight seal between the core tube and the advancing core.

The term "inflation" as used herein is intended to include inflation by any suitable fluid, gaseous or liquid.

By a "heat-resistant material having a low coefficient of friction" is meant a material capable of withstanding the temperature to which the core may be subjected whilst, at the same time, permitting the core to be drawn through the seal so formed without subjecting it to a substantial frictional force.

The term "core" includes a bare or previously covered wire or strand, and a group of bare or previously covered wires or strands constituting a cable.

Preferably the inflatable collar or, where there is more than one inflatable collar, at least one of the inflatable collars, is fitted in the bore of a tubular housing integral with or connected to the upstream end of the core tube. The tubular housing may have, at each of its ends, an apertured barrier wall through which an advancing core can pass. This barrier wall serves to restrain the inflatable collar and the inner layer of heat-resistant material against substantial movement in a direction substantially parallel to the axis of the bore.

The inflatable collar may comprise a tube of heat-resistant, elastomeric fluid-impermeable material that will encircle a core advancing through the bore of the housing, for instance an endless tube or a helically lapped tube. However, the inflatable collar preferably comprises a sleeve of such material mounted on the radially inner surface of a circumferential wall of the housing and sealed at or near each of its ends to one of the apertured barrier walls, the sleeve overlying a passage in the circumferential wall through which fluid can be introduced to inflate the sleeve.

The inner layer of heat-resistant material having a low coefficient of friction may comprise an integral part of the or each inflatable collar but it is preferably formed separately. In a preferred embodiment the inner layer of heat-resistant material is formed by helically lapping about the core a plurality of turns of an elongate flexible member of heat-resistant material.

The elongate flexible member is preferably in the form of a stranded rope or cord of the heat-resistant material. It is preferred to use a stranded rope or cord of polytetrafluoroethylene (PTFE) or of other fluorocarbon polymer or copolymer having the required properties, which may or may not contain a filler, e.g. graphite, to enhance the mechanical properties of the polymer or copolymer. To prevent unwinding and/or unravelling of the turns of rope prior to and during initial application of the circumferential compressive force exerted by the or each collar as it is inflated, it is preferred to apply about the turns of rope one or more than one lapping of tape of a heat-resistant flexible material, the lapping or lappings of tape preferably being applied with the opposite hand to that of the turns of the rope. Where the rope is of PTFE tape of the same material or of a heat-resistant plastics material compatible with PTFE is preferred.

The invention will now be described in more detail, and by way of example, with reference to the accompanying drawings, in which:

FIG. 3 is a fragmental sectional side view of preferred sealing means for effecting a fluid-tight seal between a core travelling through the core tube of the extruder and the core tube.

Figure 1:
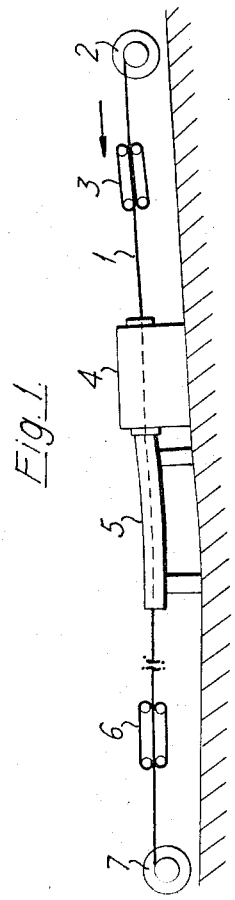
FIG. 1 is a general diagrammatic side elevation of apparatus for curing an extruded covering.
Figure 2:
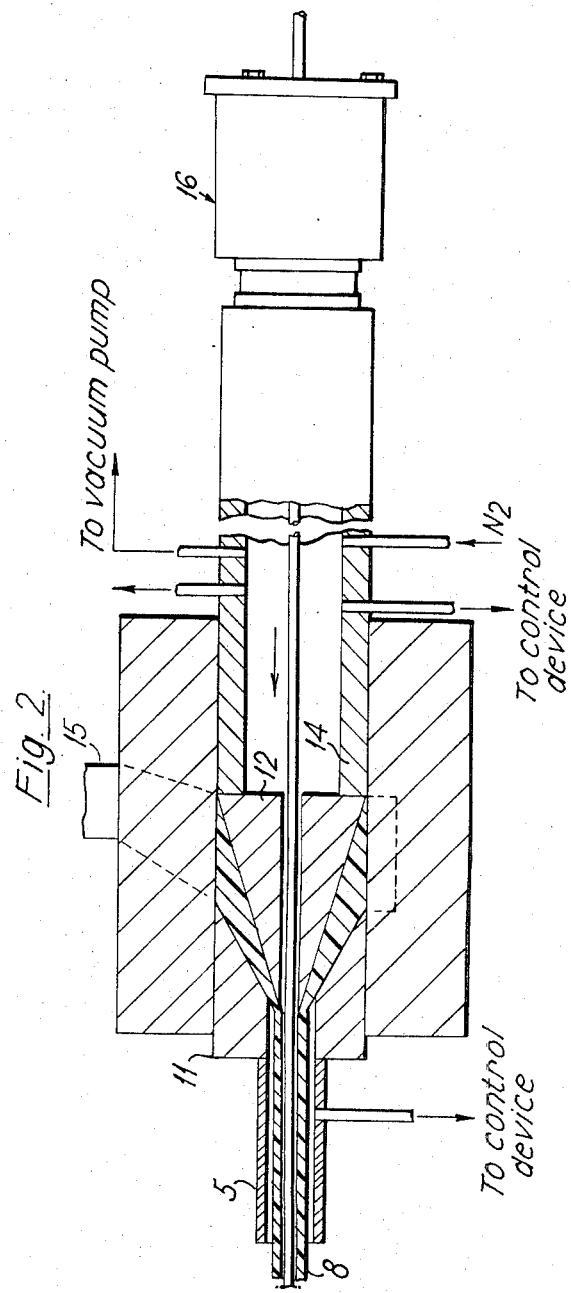
FIG. 2 is a diagrammatic longitudinal cross-section of the head of a cross-head extruder forming part of the apparatus.

As will be seen on referring to FIGS. 1 and 2, a bare solid aluminium conductor 1 of a cross-sectional shape approximating to a sector of a circle to which an extruded covering of polyethylene is to be applied, is drawn from a drum 2 by a haul-off unit 3 and is fed into an extrusion machine 4 where the polyethylene covering is applied. On emerging from the head of the extrusion machine 4 the polyethylene covered conductor 1 passes immediately into an inclined curing chamber 5 which is filled with steam at super-atmospheric pressure and, at its lower end, with cooling water at the same pressure and which hermetically sealed to the outlet end of the extrusion machine. From the chamber 5 the polyethylene covered conductor travels through vessels of cooling fluid (not shown) and is fed on to a take-up drum 7 by a haul-off unit 6.

The cross-head 10 of the extrusion machine 4 has at its outlet end an annular extrusion orifice defined by an outer die 11 and an inner die or point 12 which is secured to the forward end of a core tube 14 extending through the head. Polyethylene in a plastic state is fed to the annular extrusion orifice through a supply passage 15 where it is applied to the conductor 1. At the upstream end of the core tube 14 is the preferred sealing means, generally indicated at 16, which effects a fluid-tight seal with the conductor 1 as it passes into the core tube. The curing chamber 5 hermetically sealed to the cross-head 10 is of substantially cylindrical cross-section and has at its outlet end a seal which effects a fluid-tight seal with the polyethylene covered conductor as it emerges from the chamber.

During the extrusion of a polyethylene covering 8 on the conductor 1 and curing of the extruded covering in the curing chamber 5, steam at super-atmospheric pressure is introduced into the curing chamber and nitrogen under pressure is introduced into the core tube 14. The pressure difference across the extruded covering 8 at the extrusion orifice is maintained substantially constant at a desired value by automatic control of the pressures of the steam and/or nitrogen and/or by automatic control of leakage of nitrogen from the core tube. The value of the pressure difference is to cause the covering 8 to collapse firmly on to the core 1 as it emerges from the cross-head 10 but insufficient to force the covering back along the core tube.

As will be seen on referring to FIG. 3, the sealing means of the core tube 14 comprises a tubular housing 22 which is connected to the upstream end of the core tube and in which is mounted a tubular body 23 having a radially inwardly extending apertured wall 24 to which is secured a circumferential wall 25. A sleeve 26 of elastomeric, fluid-impermeable material is carried on the circumferential wall 25 and is sealed at its ends to a pair of apertured end walls 27. PTFE rope 28 is helically lapped about the advancing core 1, the turns of rope being pressed together between apertured end walls 29 and 30. An end wall 31, bolted to the end face of the housing 22, retains the assembly within the bore of the housing.

A passage 32 extends radially through the circumferential wall 25 and tubular body 23 from the annular space 34 enclosed by the sleeve 26 to an inlet 33. Air or other fluid can be introduced through the passage 32 to inflate the sleeve 26 and compress the turns of PTFE rope 28 radially inward on to the advancing core 1 to effect a substantially fluid-tight seal.

The present invention has the important advantage that an effective seal is provided at the upstream end of a core tube when extruding a covering layer by the "float-down technique" on a core having an external cross-sectional shape other than circular and when such a core is of pre-spiralled form, and it is especially suitable for effecting a seal with a non-circular solid metal conductor, for instance a solid aluminium conductor of a cross-sectional shape approximating to a sector or segment of a circle.

What I claim as my invention is:

1. Apparatus for extruding a covering on to an advancing core and for continuously treating the covering with a fluid medium at super-atmospheric pressure, which apparatus comprises an extrusion machine comprising a core tube extending through the extrusion machine, and an annular extrusion orifice at the outlet of the extrusion machine defined by an outer die and an inner die or point mounted on the downstream end of the core tube; sealing means associated with the core tube which permits passage of the core therethrough; a treatment chamber which is hermetically sealed to the outlet end of the extrusion machine and through which the covered core emerging from the extrusion orifice is adapted to pass; means for introducing a fluid medium under super-atmospheric pressure into the treatment chamber; and means for injecting a fluid under pressure to the interior of the core tube, wherein the sealing means comprises at least one inflatable collar associated with the core tube in such a way that it will surround a core advancing through the bore of the core tube; and, positioned between the collar and said advancing core, a radially inner layer of a heat-resistant material of a low coefficient of friction; the arrangement being such that when the inflatable collar is at least partially inflated it will be constrained to effect a circumferential compressive force radially inward on the inner layer of heat-resistant material to cause the collar and the inner layer to effect a substantially fluid-tight seal between the core tube and the advancing core.

2. Apparatus for extruding a covering on to an advancing core and for continuously treating the covering with a fluid medium at super-atmospheric pressure, which apparatus comprises an extrusion machine comprising a core tube extending through the extrusion machine, and an annular extrusion orifice defined by an outer die and an inner die or point mounted on the downstream end of the core tube; sealing means associated with the core tube which permits passage of the core therethrough; a treatment chamber which is hermetically sealed to the outlet end of the extrusion machine and through which the covered core emerging from the extrusion orifice is adapted to pass; means for introducing a fluid medium under super-atmospheric pressure into the treatment chamber; and means for injecting a fluid under pressure to the interior of the core tube, wherein the sealing means comprises a tubular housing connected to the upstream end of the core tube; at least one inflatable collar fitted in the bore of the housing in such a way that it will surround a core advancing through the bore of the housing; and, positioned between the collar and said advancing core, a radially inner layer of a heat-resistant material of a low coefficient of friction; the arrangement being such that when the inflatable collar is at least partially inflated it will be constrained to effect a circumferential compressive force radially inward on the inner layer of heat-resistant material to cause the collar and the inner layer to effect a substantially fluid-tight seal between the core tube and the advancing core.

3. Apparatus as claimed in claim 2, wherein the tubular housing has, at each of its ends, an apertured barrier wall through which an advancing core can pass and which serves to restrain the inflatable collar and the inner layer of heat-resistant material against substantial movement in a direction substantially parallel to the axis of the bore.

4. Apparatus as claimed in claim 2, wherein the tubular housing has a circumferential wall opening into which is a passage for the introduction of inflating fluid and has, at each of its ends, an apertured barrier wall through which an advancing core can pass, and wherein the inflatable collar comprises a sleeve of heat-resistant, elastomeric fluid-impermeable material mounted on the radially inner surface of said circumferential wall to overlie the opening of said passage and sealed at each of its ends to one of said two apertured barrier walls, the apertured barrier walls serving to restrain the sleeve and the inner layer of heat-resistant material against substantial movement in a direction substantially parallel to the axis of the bore.

5. Apparatus as claimed in claim 1, wherein the inner layer of heat-resistant material is separate from the inflatable collar and comprises a plurality of turns of an elongate flexible member of the heat-resistant material.

6. Apparatus as claimed in claim 5, wherein the elongate flexible member is in the form of a stranded rope.

7. Apparatus as claimed in claim 5, wherein the heat-resistant material of the elongate flexible member is a fluorocarbon polymer or copolymer.

* * * * *

UNITED STATES PATENT OFFICE
CERTIFICATE OF CORRECTION

PATENT NO. : 3,869,235
DATED : March 4, 1975
INVENTOR(S) : Alexander Joseph Moore It is certified that error appears in the above-identified patent and that said Letters Patent are hereby corrected as shown below:

In the Abstract - Line 15 --andd-- should read --and--.

Column 2 Line 63 - After --which-- insert --is--.

Column 3 Line 26 - After --is-- insert --sufficient--.

Signed and sealed this 29th day of April 1975.

(SEAL)
Attest:

RUTH C. MASON
Attesting Officer

C. MARSHALL DANN
Commissioner of Patents
and Trademarks